US008255361B2

(12) United States Patent
Igouchkine

(10) Patent No.: US 8,255,361 B2
(45) Date of Patent: Aug. 28, 2012

(54) METHOD AND SYSTEM FOR VALIDATING DIFFERENTIAL COMPUTER SYSTEM UPDATE

(75) Inventor: Vassili Igouchkine, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 637 days.

(21) Appl. No.: 10/355,555

(22) Filed: Jan. 31, 2003

(65) Prior Publication Data

US 2004/0153478 A1    Aug. 5, 2004

(51) Int. Cl.
G06F 17/00    (2006.01)

(52) U.S. Cl. ........ 707/623; 707/624; 707/639; 707/644; 707/646

(58) Field of Classification Search .................. 707/203, 707/204, 623, 624, 639, 644, 646
See application file for complete search history.

(56) References Cited

U.S. PATENT DOCUMENTS

| | | | | |
|---|---|---|---|---|
| 5,754,306 | A | * | 5/1998 | Taylor et al. ................ 358/400 |
| 5,835,777 | A | | 11/1998 | Staelin |
| 6,117,187 | A | * | 9/2000 | Staelin ......................... 717/169 |
| 6,147,773 | A | * | 11/2000 | Taylor et al. ................ 358/400 |
| 6,167,567 | A | * | 12/2000 | Chiles et al. ................ 717/173 |
| 6,366,986 | B1 | * | 4/2002 | St. Pierre et al. ............ 711/162 |
| 6,425,126 | B1 | * | 7/2002 | Branson et al. .............. 717/168 |
| 6,526,418 | B1 | * | 2/2003 | Midgley et al. .............. 707/204 |
| 6,526,574 | B1 | * | 2/2003 | Jones ........................... 717/168 |
| 6,574,729 | B1 | * | 6/2003 | Fink et al. ........................ 713/1 |
| 6,629,110 | B2 | * | 9/2003 | Cane et al. ................... 707/204 |
| 6,647,399 | B2 | * | 11/2003 | Zaremba ....................... 707/204 |
| 6,697,805 | B1 | * | 2/2004 | Choquier et al. ............ 707/610 |
| 6,725,262 | B1 | * | 4/2004 | Choquier et al. ............ 709/221 |
| 6,968,550 | B2 | * | 11/2005 | Branson et al. .............. 717/168 |
| 2002/0091718 | A1 | * | 7/2002 | Bohannon et al. ........... 707/202 |
| 2003/0066062 | A1 | * | 4/2003 | Brannock et al. ............ 717/169 |
| 2003/0084075 | A1 | * | 5/2003 | Balogh et al. ................ 707/204 |
| 2003/0163496 | A1 | * | 8/2003 | Terazono et al. ............ 707/204 |
| 2003/0220944 | A1 | * | 11/2003 | Lyman Schottland et al. .............................. 707/203 |
| 2003/0229651 | A1 | * | 12/2003 | Mizuno et al. ............... 707/200 |
| 2004/0098420 | A1 | * | 5/2004 | Peng ............................ 707/203 |
| 2004/0158817 | A1 | * | 8/2004 | Okachi et al. ................ 717/122 |
| 2005/0085222 | A1 | * | 4/2005 | Przybilski et al. ........... 455/418 |
| 2005/0132349 | A1 | * | 6/2005 | Roberts et al. ............... 717/168 |
| 2005/0132382 | A1 | * | 6/2005 | McGuire et al. ............. 719/311 |
| 2005/0210458 | A1 | * | 9/2005 | Moriyama et al. ........... 717/168 |
| 2006/0130046 | A1 | * | 6/2006 | O'Neill ........................ 717/168 |

FOREIGN PATENT DOCUMENTS

| | | |
|---|---|---|
| WO | WO 98/56149 | 12/1998 |
| WO | WO 00/77614 A2 | 12/2000 |

\* cited by examiner

*Primary Examiner* — Thanh-Ha Dang
(74) *Attorney, Agent, or Firm* — Marsh Fischmann & Breyfogle, LLP; Jon P. Deppe

(57) ABSTRACT

A method and system of validating a differential update to a computer system. One method includes comparing a list of files in a new computer system image with a list of files in a former computer system image to construct a manifest list of files comprising a subset of the new computer system images and the former computer system images. The method further includes associating information with the manifest list to facilitate determining whether a differential update comprising differences between the new computer system image and the former computer system image is valid. The method also includes comparing a list of files in a computer system to receive the differential update against the manifest list of files and using the associated information to determine if the differential update is valid for the computer system.

23 Claims, 5 Drawing Sheets

METHOD AND SYSTEM FOR VALIDATING DIFFERENTIAL COMPUTER SYSTEM UPDATE

BACKGROUND OF THE INVENTION

1. Field of the Invention

The field of the invention relates to computer systems. More specifically, embodiments of the present invention relate to determining whether a differential software update to a computer system is valid.

2. Related Art

There are many situations in which a system administrator has to install and/or update a large number of computer systems throughout an enterprise. Typically, this is a time-consuming and repetitive procedure that is either identical or very similar on every system. For example, a server farm may contain hundreds or even thousands of computer systems that will require occasional updates. In this case, the system administrator has to painstakingly update every machine. The update could be a new application program or operating system added to each computer system. Alternatively, it could be a software patch.

Any solution for updating the computer systems must be accurate. One conventional way to perform such an update is to install and configure the new or modified application program or operating system directly onto each computer system. However, this is a very time-consuming process.

A better solution is to copy the entire contents of a system image of a master computer system to the computer systems in need of an update. For example, the new or modified application or operating system is installed and configured on the master computer system. Then, the entire system image from the master machine is copied to each computer system in a file copy procedure. Then each computer system is configured with specific settings needed for this specific computer system. While this is less time consuming than performing an outright install on each computer system, it is still quite time consuming to copy the contents of an entire system image from one computer system to another and can be quite burdensome if the computing environment requires frequent minor updates. When multiplied by a hundred or even a thousand computer systems, the time to perform the updates becomes substantial.

Therefore, a need exists for a method of updating software on computer systems that is not time consuming. The update needs to be suitable for an environment with hundreds or even thousands of computer systems. The method for performing the update must also be accurate.

SUMMARY OF THE INVENTION

The present invention provides a method and system for validating a differential computer system update. Embodiments of the present invention provide a solution that is much faster than copying the contents of an entire system image to the computer system to be updated. Embodiments of the present invention provide a solution that is suitable for an environment with hundreds or even thousands of computer systems. Embodiments of the present invention provide an accurate updating solution. The present invention provides these advantages and others not specifically mentioned above but described in the sections to follow.

A method and system of validating a differential update to a computer system is disclosed. A method embodiment includes comparing a list of files in a new computer system image with a list of files in a former computer system image to construct a manifest list of files comprising a subset of the new computer system images and the former computer system images. The method further includes associating information with the manifest list to facilitate determining whether a differential update to a computer system is valid. The differential update comprises differences between the new computer system image and the former computer system image is valid. The method also includes comparing a list of files in a computer system to receive the differential update against the manifest list of files and using the associated information to determine if the differential update is valid for the computer system.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
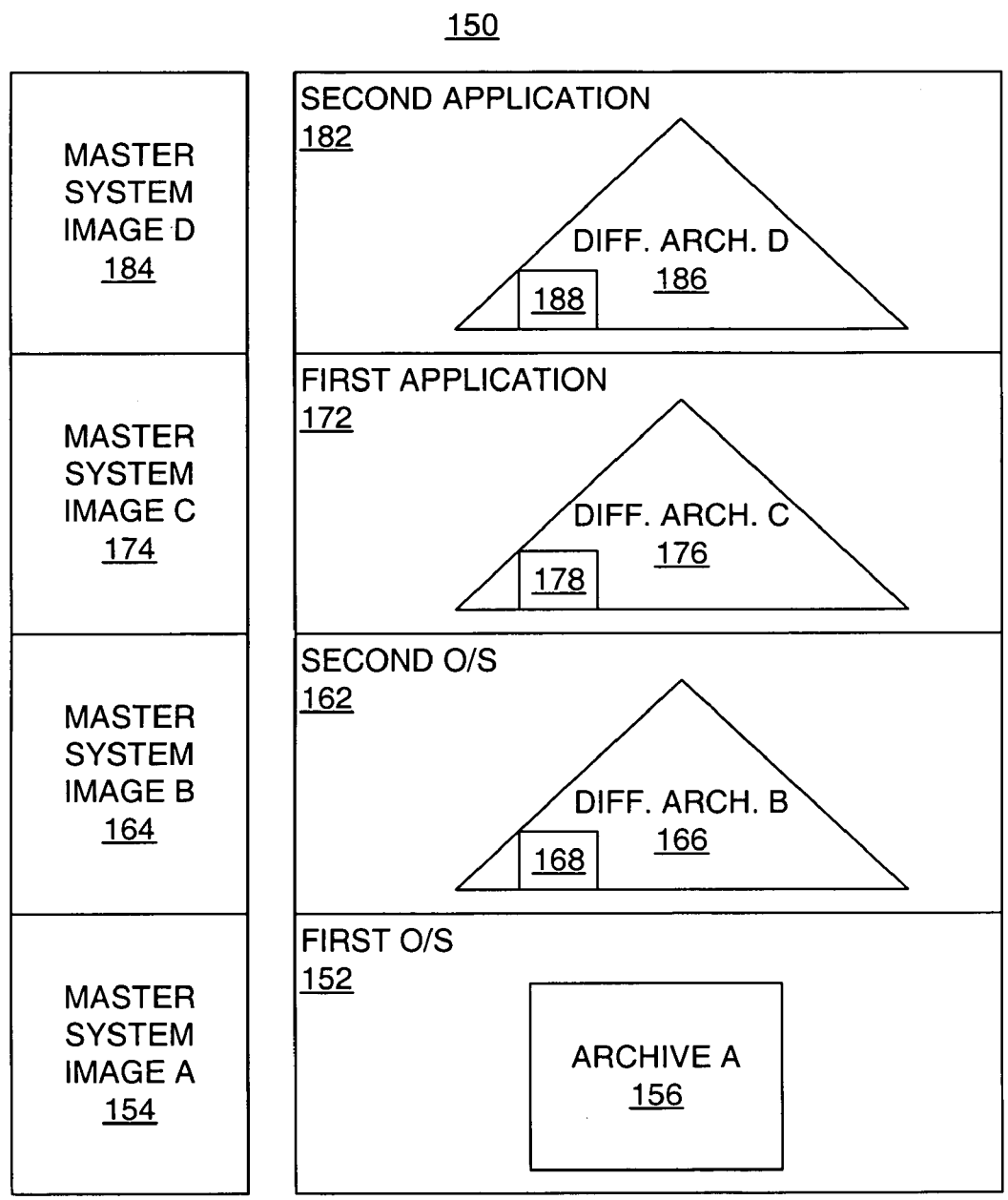
FIG. 1 is a diagram of layers of software in a master computer system suitable for differential cloning, according to an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "instantiating," "storing," "copying," "receiving," "sending," "associating," "comparing," "adding," "determining," or the like, refer to the action and processes (e.g., processes 300 and 400) of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Validating a Differential Computer System Update

In an enterprise environment, system administrators need to continuously update computer systems with new patches, packages, etc. Embodiments of the present invention dramatically decrease the amount of time required to deploy a software update to a computer system by validating a differential computer system update. By performing a differential computer system update, it is not necessary to copy the entire computer system image from the master computer system to the computer systems to be updated. The differential system update comprises the difference between a former master system image and a new master system image. The computer system receiving the differential update already has the contents of the old master system image. In many cases, the differential system image is extremely small as compared to an entire system image that would otherwise need to be copied. Thus, substantial time is saved in deploying the computer system updates.

Embodiments of the present invention validate that the differential/partial computer system update will result in a proper update to a target computer system receiving the differential update. For example, changes made to the target computer system between a former update or installation may prevent a successful differential update to the target computer system. In this case, the validation fails and the differential update is not performed.

FIG. 1 illustrates a diagram of exemplary layers of software in a master computer system 150 that are used in partial/differential cloning. Each respective layer may represent a change made to the master computer system 150, such as adding, upgrading or replacing an operating system or application program. However, the changes are not so limited. The bottom layer represents a first operating system 152 and comprises a master system image "A" 154 and an archive "A" 156. The archive "A" 156 may be a copy of all the files from the master system image "A" 154. It is possible to copy the archive "A" 156 to a target computer system in order to cause the target to have a system image that is identical to the master system image "A" 154.

The higher layers in the master computer system 150 have differential archives. For example, the second layer may result from the adding a second system image, which contains a second operating system 162 to the master computer system 150. Thus, the master system image "B" 164 contains the second operating systems 162. However, the differential archive "B" 166 contains only the differences between the master system image "A" 154 and the master system image "B" 164. As a result, the differential archive "B" 166 contains all the data necessary for updating a target computer system to add the second operating system 162. After validating the differential update and copying the differential archive "B" 166 to the target computer system, the target computer system image will be equal to the master system image "B" 164. In this example, in order for the validation to pass, the target computer system may already have the first operating system 152 installed.

The differential archive "B" 166 also contains a "B" manifest 168. The "B" manifest 168 contains a list of files based on files in the master system image "A" 154 and the master system image "B" 164, along with associated information that is used during deployment of the target computer system to determine whether a differential update will be successful.

Still referring to FIG. 1, the third layer results from the additional of a first application program 172 to the master system 150. The master system image "C" 174 thus contains both the second operating systems 162 and the first application program 172. However, the differential archive "C" 176 contains only the difference between master system image "C" 174 and master system image "B" 164. Thus, it will be suitable for an update to a target system that needs only the first application program 172, assuming that it already has the first and second operating systems 152 and 162. The "C" manifest 178 in the differential archive "C" 176 contains a list of files that is based on the files in the master system image "C" 174 and the master system image "B" 164. Also included is information to determine whether a differential update to a target computer system will be valid, based on files on the target system and the manifest file list and associated information.

FIG. 1 contains a fourth layer representing a second application program 182 that was added to the master computer system 150. This layer has a "D" manifest 188 and a differential archive "D" 186, corresponding to the master system image "D" 184. A given layer may correspond to any differences between the system image and the system image one layer below. There may be any number of layers, each but the bottom layer having a differential archive. As mentioned above, the bottom layer contains a complete archive of the master system image (e.g., 154).

Figure 2:
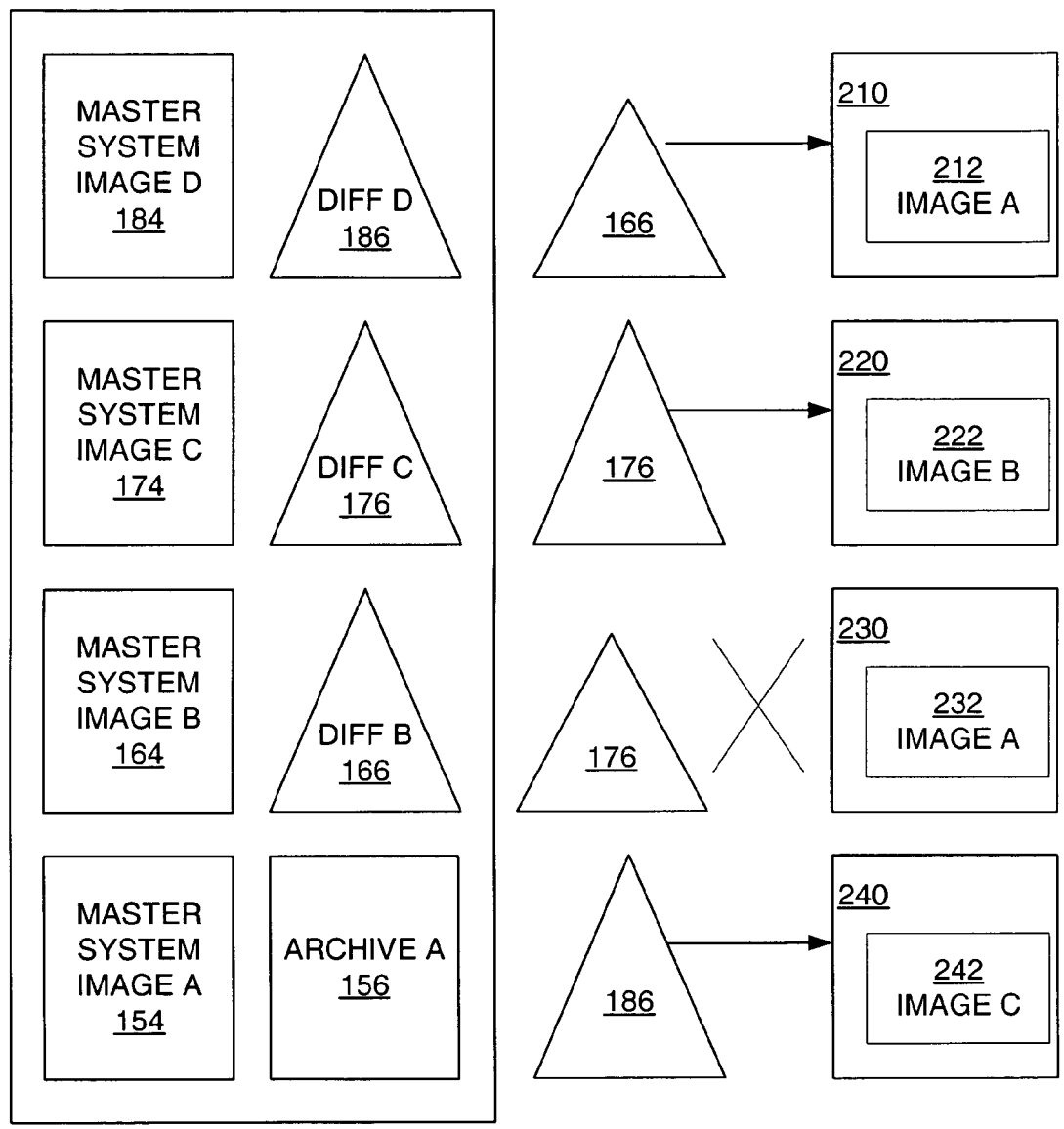
FIG. 2 is a block diagram illustrating differential software updates in a multi-computer system, in accordance with an embodiment of the present invention.

FIG. 2 illustrates an exemplary environment in which multiple computer systems receive a partial update, provided that the partial update is validated. The environment has a master computer system 150 having stored thereon a number of differential archives suitable for differential updates. A first target computer system 210 has on it a target computer system image "A" 212, which is the equivalent of master computer system image "A" 154. The images are not necessarily identical as the first target computer system 210 may have been configured with settings that are different from the master computer system 150.

The first target computer system 210 is about to receive a partial update from the master computer system 150 by receiving a copy of the differential archive "B" 166. However, embodiments of the present invention will first determine if the differential update is valid.

The second target computer system 220 has an image 222 that is equivalent to master system image "B" 164 and is about to receive a partial update by receiving a copy of the differential archive "C" 176. Again, the differential update only proceeds if validation passes.

The third target computer system 230 has an image 232 that is equivalent to master system image "A" 164. In this case, a partial update based on the differential archive "C" 176 would not be appropriate because the third target system 230 does not have the correct image for this differential update.

The fourth target computer system 240 has an image 242 that is equivalent to master system image "C" 174 and is about to receive a partial update by receiving a copy of the differential archive "D" 186. Again, the differential update only proceeds if validation passes.

Figure 3:
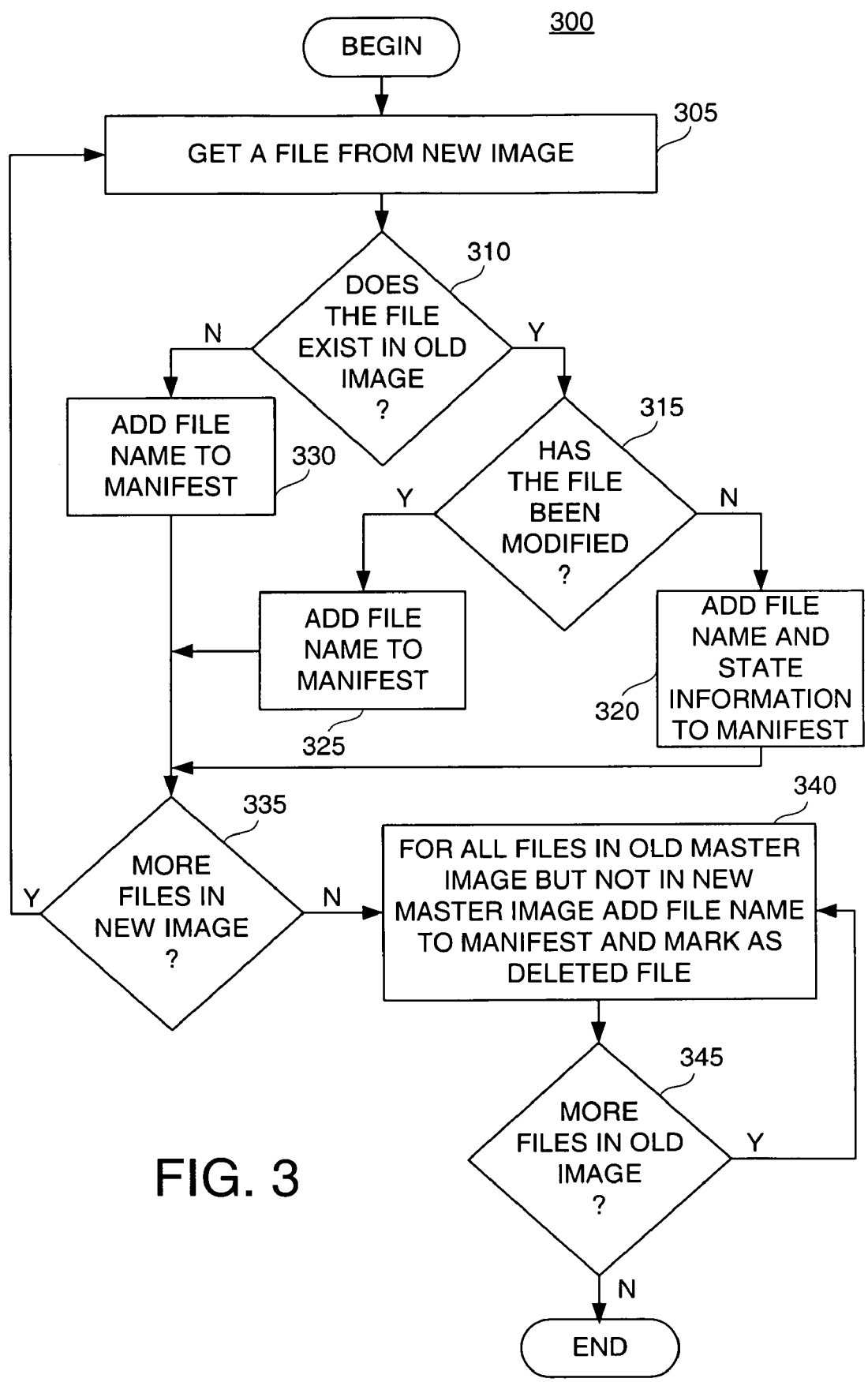
FIG. 3 is a flowchart illustrating steps of a process of generating a file list to be used in validating a computer system differential update, according to an embodiment of the present invention.

Embodiments of the present invention build a manifest file to be used in the validation of a differential update, according to an embodiment of the present invention. A manifest file may be constructed when the associated differential archive is built. FIG. 3 shows steps of a process 300 of building a manifest file. Steps of process 300 of FIG. 3 may be stored as instructions on a computer readable medium and executed on a general-purpose processor. The process 300 compares files from the new master system image to files in the old master system image and associated information with files in the manifest such that a future differential update may be validated. In step 305, a file from the new master system image is obtained. To achieve this, a directory may be scanned.

In step 310, a comparison is made with the old master system image to determine if a version of the file also exists there. If it does, then step 315 is taken, otherwise step 330 is taken.

If step 315 is taken, then a check is made to determine if the file has been modified. For example, a modification date associated with the file is checked to determine whether the version is the same in both the old and new master system images. If desired, a check such as a bit-by-bit comparison may be performed, although this is not required.

If step 315 indicates that no modification to a file has occurred, then the file name and state information is added to the manifest file, in step 320. The state information may be used during a differential update validation process. Since the files are identical in the old and new master system images, a future differential update would not copy this file to the target computer system to be updated. Thus, during the differential update process if the state information on a target computer system indicates that the files are no longer identical, as determined by the state information, then the validation process may be aborted (e.g., fail).

If step 315 indicates that a modification has occurred to the file, then the file name is added to the manifest file, in step 325. However, no state information needs to be added. In a future differential update, the modified version of the file will be deployed on the target computer system. The fact that there is not state information associated with this file may be used in the validation determination. For example, validation will not fail because the target system image will be the same as the new master system image after the update.

If step 310 indicates that the file did not exist in the old master system image, then the file name is added to the manifest in step 330. A future differential update will copy this file to the target computer system. The fact that there is not state information associated with this file may be used in the validation determination. For example, validation will not fail because the target system image will be the same as the new master system image after the update.

The process 300 parses through all files in the new master system image by returning to step 305, until all files have been compared to the old master system image. Step 335 performs this check.

Then the process 300 goes to step 340, which starts the processing of files in the old master system image. All files that are in the old master system image but not in the new master system image have their names added to the manifest. They are also marked as files that were deleted when going from the old master system image to the new master system image. Because this file exists in the old master system image but not the new master system image, it will not be added by the file copy done by the differential update. However, this file will likely exist on the target computer system as a result of a previous update or installation. Thus, it may be deleted as part of the differential update such that the resulting image on the target system mirrors that of the new master system image.

Step 345 checks to determine if all files from the old master system image are processed. When they are, the process 300 ends. The manifest is now constructed based on a list of files from the new master system image and the old master system image, along with associated information to perform a differential update validation.

An embodiment of the present invention is a process of validating a differential update to a computer system. The process may be achieved by comparing an old computer system image to a new computer system image to determine information related to differences between the old computer system image to a new computer system image. Then the process may determine whether a differential update is valid for a target computer system based on files in the target computer system and the information.

Figure 4:
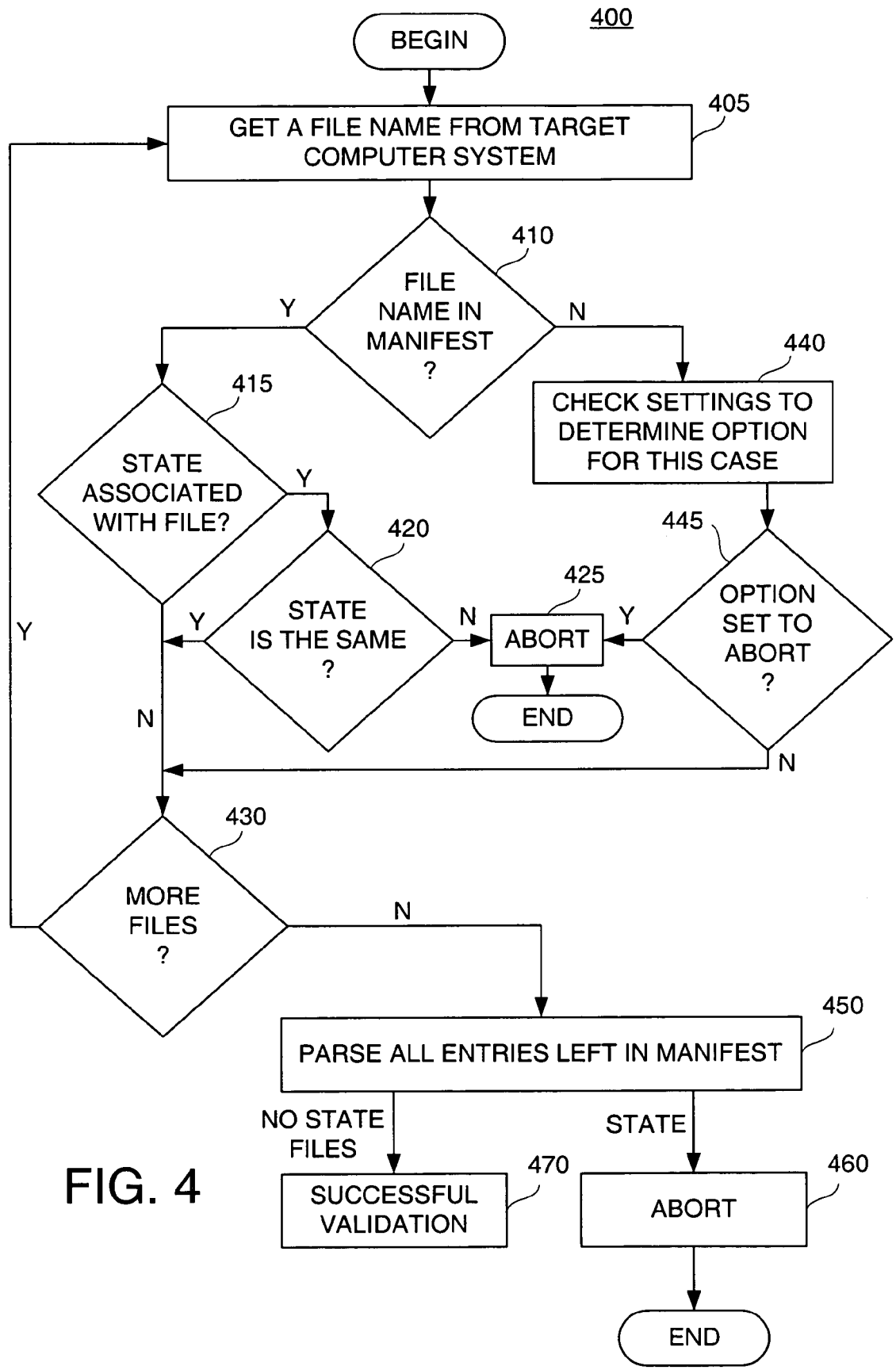
FIG. 4 is a flowchart illustrating steps of a process of validating a computer system differential update, according to an embodiment of the present invention.

Process 400 of FIG. 4 is one embodiment for such a validation process. However, the present invention is not limited to such an embodiment. Steps of process 400 of FIG. 4 may be stored as instructions on a computer readable medium and executed on a general-purpose processor. Process 400 may use a manifest such as the one produced in process 300 of FIG. 3, but embodiments of the present invention are not limited to using the manifest to perform validation. For example, the information in the manifest may be generated at the time validation is performed. Process 400 compares files from the target computer system to be updated with the manifest and uses the information in the manifest to validate the update. In step 405, the parsing of the files on the target computer system begins by getting a file from a directory on the target system.

In step 410, the manifest is checked to determine if the file name from the target system exists in the manifest as well. If it exists there, step 415 is taken. If it does not step 440 is taken.

In step 415, the manifest is checked to determine if there is state information associated with the file. If there is state information associated with the file, the state information in the manifest is compared to state information from the target file to determine if the files are identical, in step 420. If the files are not identical, then the validation fails and the process 400 is aborted, in step 425. Thus, the differential update will not be performed. Then, the process 400 ends.

If step 420 determines that the files are identical, based on a comparison of state information, then step 430 is taken to determine if there are more files on the target computer system. If so, the process 400 returns to step 405 to continue parsing the files on the target computer system.

If step 415 determines that there is not state information associated with the file in the manifest, then the process 400 goes to step 430 to determine if there are more files on the target computer system. As discussed in process 300 of FIG. 3, situations in which there is not state information associated with the file may include files that were new, modified or deleted as between the new master system image and the old master system image. If there are more files on the target system to parse, the process 400 returns to step 405.

When comparing file names from the target system to the manifest sometimes step 410 will determine that the target file name is not in the manifest. In this case, step 440 is performed to determine whether the validation process 400 should be aborted. For example, there may be pre-established settings that allow the customer to control whether the process 400 should be aborted when a file is found on the target system and it does not exist in the manifest. This gives the customer an opportunity to keep a file on the target system after a differential update has been performed.

Step 445 is a branch based on the setting. If the setting is to abort, then step 425 is taken. The process 400 then ends with the validation failing. Thus, a differential update will not be performed.

On the other hand, if the setting indicates that the validation may continue, then step 430 is taken to determine if there are more files to parse on the target system. Eventually there are no more files on the target computer system to compare with the manifest, and step 430 directs the process 400 to step 450.

There may be files in the manifest that do not have a corresponding file on the target system. In step 450, all those remaining file entries in the manifest are parsed. If any of the remaining files in the manifest has associated with it state information, the process 400 aborts in step 460. The process 400 then ends with the validation failing. A differential update will not be performed.

If the parsing of step 450 determines that none of the remaining manifest files has state information associated therewith, then step 470 is taken. Step 470 is successful validation. Thus, a differential update may be performed. Those of ordinary skill in the art will recognize that there are alternative ways to accomplish the file-by-file comparison of process 400.

Figure 5:
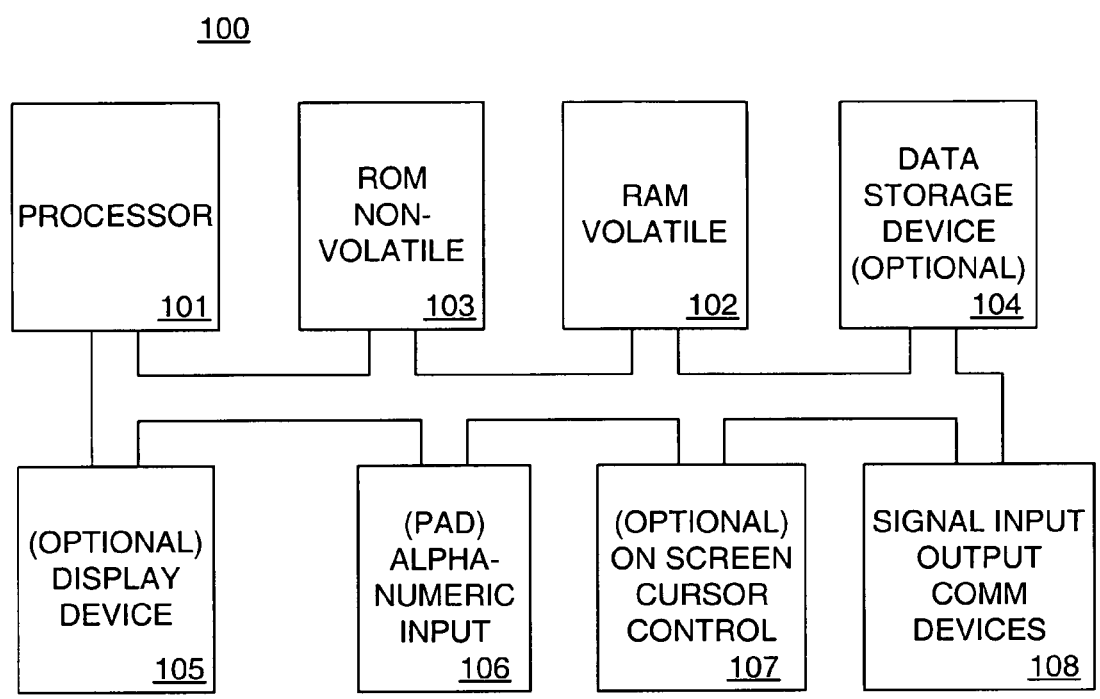
FIG. 5 is a logical block diagram of an exemplary computer system that may be used to implement embodiments of the present invention.

Referring now to FIG. 5, a block diagram of exemplary computer system 100 is shown. It is appreciated that computer system 100 of FIG. 5 described herein illustrates an exemplary configuration of an operational platform upon which embodiments of the present invention can be implemented. Nevertheless, other computer systems with differing configurations can also be used in place of computer system 100 within the scope of the present invention.

Computer system 100 includes an address/data bus 99 for communicating information, a central processor 101 coupled with bus 99 for processing information and instructions, a volatile memory unit 102 (e.g., random access memory, static RAM, dynamic RAM, etc.) coupled with bus 99 for storing information and instructions for central processor 101 and a non-volatile memory unit 103 (e.g., read only memory, programmable ROM, flash memory, EPROM, EEPROM, etc.) coupled with bus 99 for storing static information and instructions for processor 101. Computer system 100 may also contain an optional display device 105 coupled to bus 99 for displaying information to the computer user. Moreover, computer system 100 also includes a data storage device 104 (e.g., disk drive) for storing information and instructions. In one embodiment of the present invention, data storage device 104 is a cache memory.

Also included in computer system 100 of FIG. 5 is an optional alphanumeric input device 106. Device 106 can communicate information and command selections to central processor 101. Computer system 100 also includes an optional cursor control or directing device 107 coupled to bus 99 for communicating user input information and command selections to central processor 101. Computer system 100 also includes signal communication interface 108, which is also coupled to bus 99, and can be a serial port. Communication interface 108 can also include number of wireless communication mechanisms such as infrared or a Bluetooth protocol.

Embodiments of the present invention a method and system for validating a differential computer system update have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of updating a computer system, comprising:

comparing a list of files in a later master computer system image with a list of files in a prior master computer system image to construct a manifest list of files to be used in performing a differential system image update of a target computer system having the prior master computer system image installed thereon, wherein the later master computer system image represents a direct modification of the prior master computer system image, the manifest list of files defining modifications of the prior master computer system image necessary to arrive at the later master computer system image;

associating file state information with at least a portion of said manifest list of files corresponding to both said prior master computer system image and said later master computer system image; and determining whether use of the manifest list of files to perform the differential system image update of the target computer system would be valid, wherein use of said manifest list of files is valid when said file state information associated with said portion of said manifest list of files concurs with file state information for corresponding files of said target computer system that is to receive said differential system update.

2. The method of claim 1, further comprising:

comparing a list of files corresponding to said manifest list of files in the target computer system that is to receive said differential system image update against said manifest list and using said associated file state information to determine if said differential system image update is valid for said target computer system.

3. The method of claim 2, further comprising:

copying to said target computer system an archive of files that comprises a difference between said later master computer system image and said prior master computer system image if said differential system image update is determined to be valid.

4. The method of claim 3, further comprising constructing said archive.

5. The method of claim 1, wherein said comparing comprises:
adding a file name to said manifest list of files in response to determining that said file is in said later master computer system image and not in said prior master computer system image.

6. The method of claim 1, wherein said comparing comprises:
adding a file name to said manifest list of files in response to determining that said file is in both said later master computer system image and said prior master computer system image.

7. The method of claim 6, wherein said adding further comprises associating file state information with said file name in response to determining that said file is essentially identical in said prior master computer system image and said later master computer system image.

8. The method of claim 1, wherein said comparing comprises:
adding a file name to said manifest list of files in response to determining that said file is not in said later master computer system image but is in said prior master computer system image.

9. The method of claim 8, wherein said adding further comprises denoting that said file is not present in said later master computer system image.

10. The method of claim 1, wherein said prior master computer system image corresponds to an anticipated representation of a target computer system to be updated and said later master computer system image corresponds to an updated representation of a target computer system.

11. A method of validating a computer system update, comprising:
comparing a prior master computer system image to a later master computer system image to determine information related to differences between said prior master computer system image and said later master computer system image, wherein the later master computer system image represents a direct modification of the prior master computer system image, wherein the information related to differences defines modifications of the prior master computer system image necessary to arrive at the later master computer system image, and wherein said prior master computer system image corresponds to an anticipated representation of a target computer system to be updated and said later master computer system images corresponds to an updated representation of a target computer system; and
determining whether a differential system image update is valid for a target computer system based on files in said target computer system and said information related to differences between said prior master computer system image and said later master computer system, wherein said differential system image update comprises a difference between said later master computer system image and said prior master computer system image;
wherein said differential system image update is valid if file state information corresponding to said files in said target computer system correspond to file state information corresponding to files in said prior master computer system image.

12. The method of claim 11, wherein said determining further comprises determining, based on said information, that a modification to a file on said target computer system will not allow a valid differential system image update to said target computer system.

13. The method of claim 11, wherein said determining further comprises determining that said differential system image update is invalid due to deletion of a file on said target computer system, based on said information.

14. The method of claim 11, wherein said comparing comprises checking a flag to determine whether said differential system image update is valid if a file unexpectedly exists on said target computer system based on said information.

15. A non-transitory computer readable medium having stored thereon instructions which, when executed on a general purpose processor, implement a method of validating a computer system update, said method comprising:
first comparing a list of files in a later master computer system image with a list of files in a prior master computer system image to construct a manifest list of files to be used in performing a differential system image update of a target computer system having the prior master computer system image installed thereon, wherein the later master computer system image represents a direct modification of the prior master computer system image, the manifest list of files defining modifications of the prior master computer system image necessary to arrive at the later master computer system image;
associating file state information with at least a portion of said manifest list of files occurring in both said prior master computer system image and said later master computer system image to facilitate determining whether use of the manifest list of files to perform the differential system image update of the target computer system would be valid; and
second comparing file state information for a list of files in the target computer system that is to receive said differential system image update against said file state information for said portion of said manifest list of files, wherein said differential system image update is valid for said target computer system when said file state information for said list of files in the target computer system concur with said file state information for said portion of said manifest list of files.

16. The non-transitory computer readable medium of claim 15, wherein said method further comprises:
copying to said target computer system an archive of files that comprises a difference between said later master computer system image and said prior master computer system image if said differential system image update is determined to be valid.

17. The non-transitory computer readable medium of claim 16, wherein said method further comprises constructing said archive.

18. The non-transitory computer readable medium of claim 15, wherein said second comparing of said method comprises determining that said differential system image update is invalid due to deletion of a file on said target computer system, based on said information.

19. The non-transitory computer readable medium of claim 15, wherein said first comparing of said method comprises adding to said manifest list of files all files from said later master computer system image and files existing in said prior master computer system image but not said later master computer system image.

20. The non-transitory computer readable medium of claim 15, wherein said associating of said method comprises assigning a state to a file in said manifest list of files if said file exists in both said later master computer system image and said prior master computer system image.

21. The non-transitory computer readable medium of claim 15, wherein said second comparing of said method comprises checking a flag to determine whether said differential system image update is valid if a file exists on said target computer system but does not exist in said manifest list of files.

22. The non-transitory computer readable medium of claim 15, wherein said associating of said method comprises determining, based on said information, that a modification to a file on said target computer system will not allow a valid differential system image update to said target computer system.

23. The non-transitory computer readable medium of claim 15, wherein said associating of said method further comprises associating said file state information to said files based on whether a file has been deleted, modified, or added from said prior master computer system image to arrive at said later master computer system image.

* * * * *